United States Patent [19]

Stover

[11] 3,780,279

[45] Dec. 18, 1973

[54] MEANS FOR EXTENDING THE IDENTIFICATION RANGE OF RADIO EQUIPMENTS USING REPETITIVE CODED IDENTIFICATION SIGNALS

[75] Inventor: Harris A. Stover, Cedar Rapids, Iowa

[73] Assignee: Collins Radio Company, Cedar Rapids, Iowa

[22] Filed: Jan. 17, 1972

[21] Appl. No.: 218,194

[52] U.S. Cl. ............ 235/164, 235/156, 235/150.51, 328/165

[51] Int. Cl. ............................................ G06f 7/38

[58] Field of Search .................... 235/181, 183, 152, 235/156, 164; 328/163, 165; 343/17.1; 340/174.1 R; 179/100.2 K

[56] References Cited

UNITED STATES PATENTS

| | | | |
|---|---|---|---|
| 3,315,171 | 4/1967 | Becker | 328/163 |
| 3,378,825 | 4/1968 | Offner | 340/174.1 |
| 3,480,932 | 11/1969 | Brandstadter | 340/174.1 |
| 3,506,813 | 4/1970 | Trimble | 235/152 |
| 3,557,354 | 1/1971 | Trimble | 235/152 |
| 3,518,414 | 6/1970 | Goodman et al. | 235/156 |
| 3,614,337 | 10/1971 | Minami | 179/100.2 K |
| 3,665,429 | 5/1972 | Thornley | 179/100.2 K |
| 3,717,756 | 2/1973 | Stitt | 235/156 X |

FOREIGN PATENTS OR APPLICATIONS

| | | | |
|---|---|---|---|
| 1,473,006 | 2/1967 | France | 235/181 |

*Primary Examiner*—Felix D. Gruber
*Attorney*—Richard W. Anderson et al.

[57] ABSTRACT

A signal processing means coherently adds a repetitively received code sequence to that previously received while incoherently adding accompanying noise and generates a replica of the code sequence which is "pulled up" out of the noise level. Complementary percentages of a code sequence currently received and that previously received and stored are continuously added on a repetitive coherent basis by either analog or digital means.

5 Claims, 2 Drawing Figures

Figure 1:
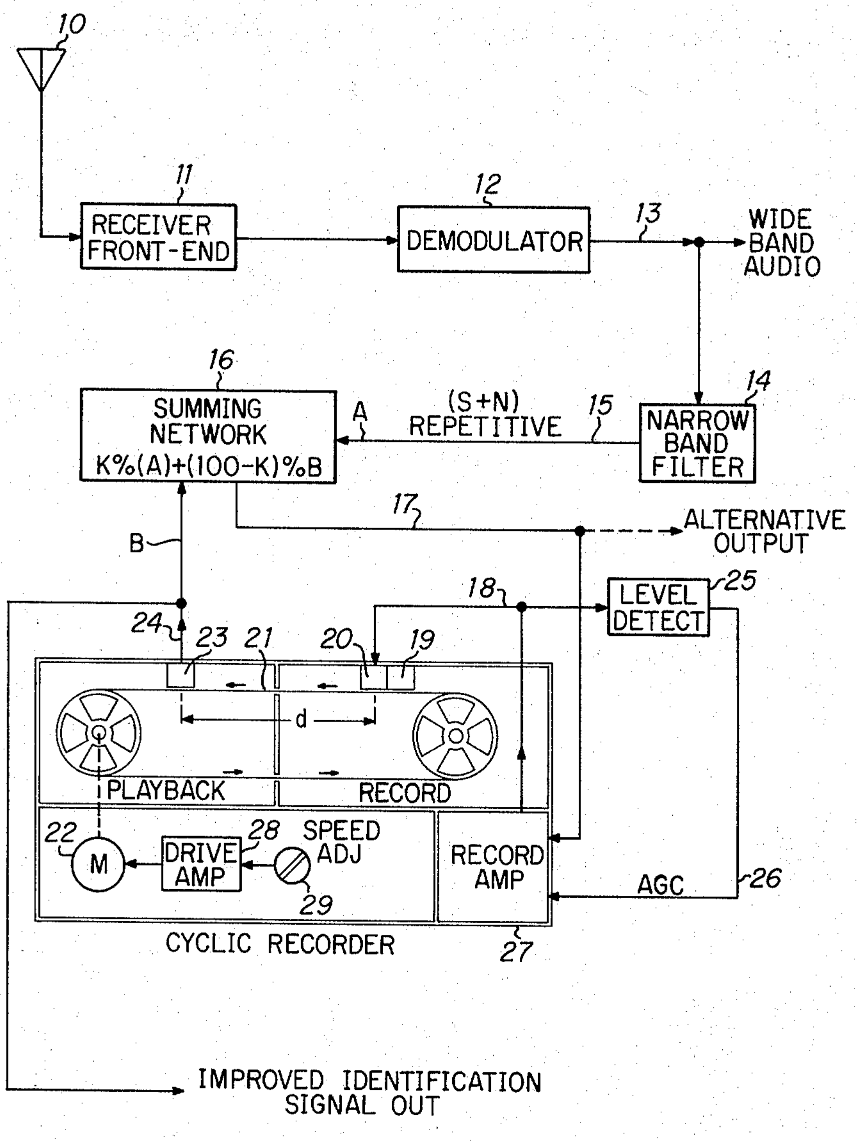

MEANS FOR EXTENDING THE IDENTIFICATION RANGE OF RADIO EQUIPMENTS USING REPETITIVE CODED IDENTIFICATION SIGNALS

This invention relates generally to the improvement of signal-to-noise ratio in radio receivers and more particularly to the improvement of signal-to-noise ratio in a receiver which demodulates coded identification signals of a repetitive nature.

Numerous radio equipments utilize coded periodic identification signals as a means of station identification. For example, automatic direction finding receivers develop bearing indications from transmitting stations which provide a carrier wave modulated by a coded identification signal on a periodic basis such that the station to which the receiver indicates direction is identifiable. The identification signals may be in the form of coded modulation sequences effected by keying the carrier or by tonal amplitude modulation of the carrier.

Direction finding receivers have been vastly improved as to direction finding capability. In the absence of improved means for identifying stations to which direction is indicated, however, the useful range of automatic direction finding receivers, for example, is limited by the extent to which the receiver can recover the amplitude modulated identification signal under adverse signal-to-noise conditions.

In my copending application Ser. No. 206,616 filed Dec. 10, 1971 entitled "Means For Extending The Useful Range Of Automatic Direction Finding Receivers" and assigned to the assignee of the present invention, there is described a means employing adaptive amplitude limiting for improving the station identification capabilities of an automatic direction finding receiver.

Since the extended capability of state of the art direction finding receivers to point at distant stations is useful only to the extent that the more distant stations to which a bearing indication is indicated may be identified, the useful range of such equipments may be further extended by increasing the receiver's station identification capability in the presence of adverse signals and noise conditions.

Accordingly, a general object of the present invention is the provision of a means for enhancing the capability of a receiver to recover modulated intelligence information in the presence of extreme noise.

A more specific object of the present invention is the provision of means for operating on demodulated intelligence in the form of repetitive code transmissions in a manner permitting accurate recovery of the coded transmissions even though the intelligence may be so obscured by noise that normal demodulation techniques are incapable of recovering the intelligence.

The present invention is featured in the provision of an integrative or coherent signal processing means which coherently adds a received code during each occurrence to that received during a previous coded transmission, while incoherently adding the noise accompanying such received codes with the result that a replica of the desired improved signal is developed which is "pulled up" out of the noise level after a predetermined number of coded transmission cycles.

Figure 2:
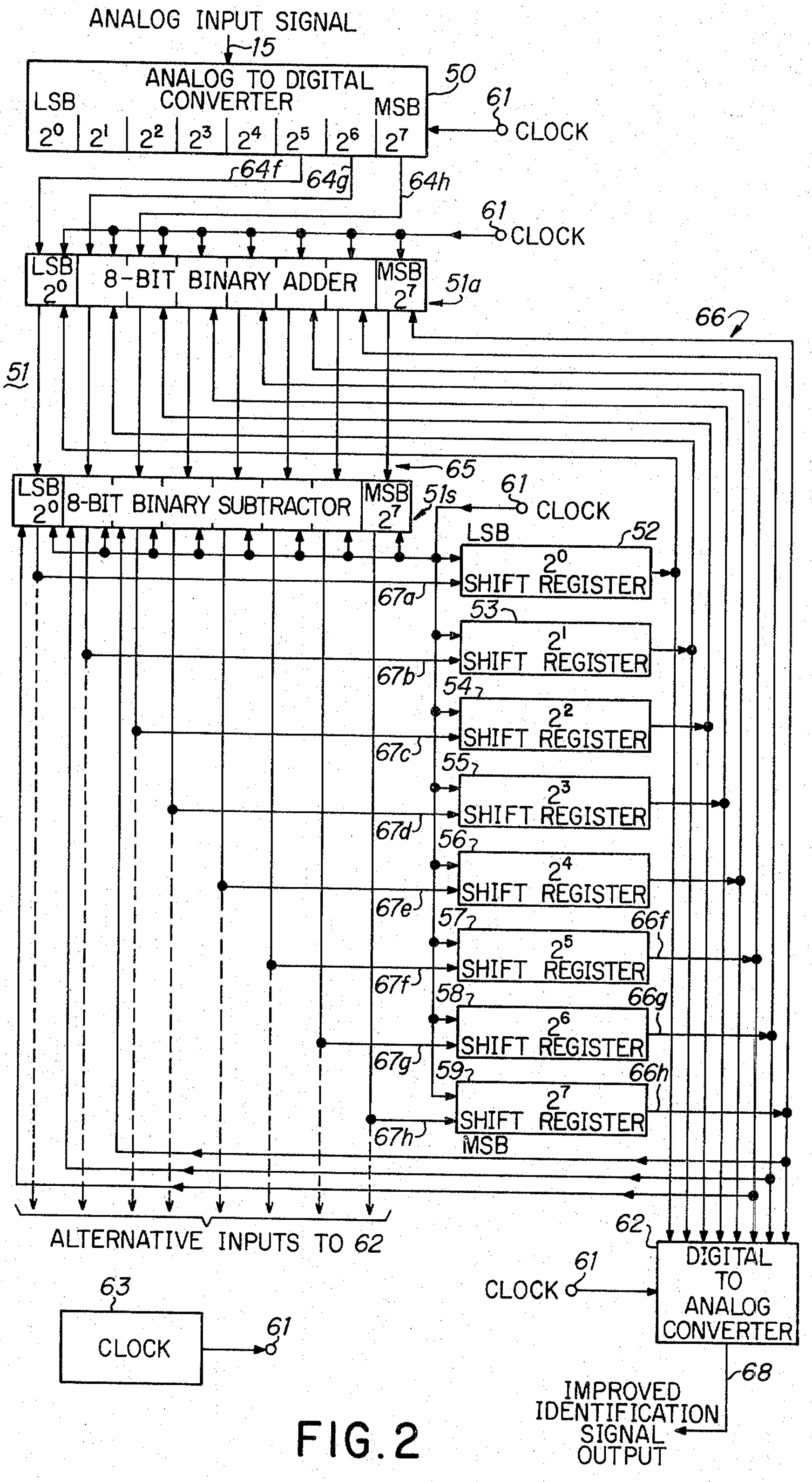

These and other features and objects of the present invention will become apparent upon reading the following description with reference to the accompanying drawing in which;

FIG. 1 is a functional block diagram of an analog embodiment in accordance with the present invention for improving the reception of repetitive coded transmission signals under adverse noise conditions; and FIG. 2 is a digital embodiment in accordance with the present invention for improving the reception of repetitive coded transmission signals under adverse noise conditions.

This invention operates generally on the principle of combining a predetermined percentage $K$ of an instantly received coded identification modulation sequence with a complementary percentage $(100 - K)$ of the previously received coded transmission sequence. The summation process is carried out on a synchronous basis by either analog or digital means and provides an output signal, after a predetermined number of received coded sequences, which approaches a steady state level as an accurate noise free replica of the received code.

An analog embodiment of the present invention is depicted functionally in FIG. 1. For purposes of discussion, let it be assumed that Morse code identification is employed. FIG. 1 generally depicts a receiving antenna 10 supplying a received signal to the front end of a receiving means 11 which applies a signal to receiver demodulator 12 the output 13 of which comprises a station identification signal in the form of a repetitive Morse code sequence, or cyclic repetitive sequences of code bits which identify the station to which the receiver is tuned. The output 13 from the demodulator 12 might be applied through a narrowband filtering means 14 to provide a demodulation signal 15 which represents both signal and noise $(S + N)$ as concerns the demodulated identification code.

For explanation purposes as concerns the FIG. 1 embodiment, the assumption is made that the identification code is repeated with a repetition period $T_1$ equal to the reciprocal of the code sequence repetition frequency $F_1$. It will be further assumed that this repetition period is a known standard which is the same for all stations to which the receiver is to be tuned. For example, numerous beacon and automatic direction finding ground stations operate on a standard repetitive sequence of code transmissions for station identification purposes.

The demodulated repetitive code transmission 15 is applied as a first input A to a summing network 16. The output 17 from summing network 16 is applied to a cyclic recorder which, as illustrated, might comprise a tape recorder with a continuous tape loop 21. The recorder might equally employ a magnetic disc or magnetic drum. The output 17 from summing network 16 is applied as an input to recording amplifier portion 27 of the tape recorder which provides an output 18 applied to the record head 20. An erase head 19 immediately precedes record head 20 such that any previously recorded information is completely removed prior to the recording of the output 17 from summing network 16. The recorder further includes a playback head 23 the output 24 of which is applied as a second input B to summing network 16 and additionally may comprise the improved identification signal output in accordance with the present invention. Playback head 23 is placed relative to the record head 20 such that they differ in time (on the recording) by one identification code period $T_1$, or an integer multiple thereof. Thus, when record head 20 is recording the incoming signal, the playback head 23 will be at the corresponding point on the previously received identification code sequence. It is to be realized that in the depicted functional embodiment the distance $d$ between the record and playback heads 19 and 23, and the rate of tape advance between heads as imparted by motor 22, would be selected to arrive at the above-defined relationship between that being instantaneously recorded and that being played back at a given instant of time. For this purpose FIG. 1 further functionally depicts a driving amplifier 28 with associated speed adjust control 29 by means of which the tape advance speed may be selected.

In accordance with the present invention the signal applied to the recording head 20 consists of some percentage $K$ of the incoming signal 15 plus a complementary percentage $(100 - K)$ of the signal 24 from recorder playback head 23. This may be accomplished by design of summing network 16 which, as depicted, develops an output signal 17 expressed as $K$ percent $(A) + (100 - K)$ percent $(B)$, where $A$ is the coded sequence 15 being received at any time, and $B$ is the playback of the corresponding point on the previously recorded code transmission. Since any previously recorded information is erased prior to recording new information by means of erase head 19 in a conventional manner, a new code signal input plus noise is then constantly being added in a particular ratio to the already recorded signal at all times. Because of the synchronous relationship between the playback signal and the newly received identification code, which results from the playback being effected one identification period (or an integer multiple thereof) from the record head, the received code signal always adds coherently to the previously recorded signal while the noise adds incoherently, it being realized that noise does not have the repetitive characteristic of the signal. This results in a recorded signal which is pulled up out of the noise level after a few record cycles. Either the output 24 from the playback head 23 or, alternatively, the output 17 from the summing network as applied to the recorder, comprises the improved identification signal output.

The manner in which a recorded signal is developed which is pulled up out of the noise level after a few record cycles might best be illustrated by considering a specific operating example.

Let it be assumed that the record head 20 adds 40 percent signal from the output 15 of filter 14 as applied to the summing network 16. In accordance with the present invention this establishes that the summing network 16 adds 60 percent of the signal 24 from playback head 23. For convenience, let it be assumed that there is no signal on tape 21 at the start of the sequence to be exampled. This assumption is not necessary but convenient for explanation purposes. Thus, a signal applied to the record head 19 is made to be 40 percent of the incoming signal $A$ plus $(100 - K)$ percent (60 percent) of the signal from the playback head 23. A new code signal input plus noise is then completely being added in a particular ratio to the already recorded signal at all times.

With the assumption that prior to a first identification code period $T_1$ there is no signal recorded on the tape 21, the recorded signal will be $0.4S$ (where $S$ is the signal component of input $A$ to summing network 16) and the recorded noise will be $0.4N$ (where $N$ is the noise component of the input signal $A$ applied to summing network 16). After the second identification code period, the recorded signal will be $0.4S + 0.6\,(0.4S) = 0.64S$, while the recorded noise will be:

$$[(0.4N)^2(0.6)^2 + (0.4N)^2]^{1/2} = \sqrt{0.2176}\,N$$

At the end of the third identification period, the recorded signal will be:

$$(0.64S)\,0.6 + 0.4S = 0.784S,$$

and the recorded noise will be:

$$[(0.2176N^2)\,(0.36) + 0.16N^2]^{1/2} = \sqrt{0.2383}\,N.$$

At the end of the fourth identification period, the signal will be:

$$(0.784S)\,0.6 + 0.4S = 0.8704S,$$

and the noise will be:

$$[(0.2383N^2)\,(0.36) + 0.16N^2]^{1/2} = \sqrt{0.2458}\,N.$$

To illustrate this more clearly, Table I below lists both the signal and noise as a function of the identification repetitions.

TABLE I

| Identification Repetition | Signal | Noise |
|---|---|---|
| 0 | 0 | 0 |
| 1 | 0.4S | $\sqrt{0.16}\,N$ |
| 2 | 0.64S | $\sqrt{0.2176}\,N$ |
| 3 | 0.784S | $\sqrt{0.2383}\,N$ |
| 4 | 0.8704S | $\sqrt{0.2458}\,N$ |
| 5 | 0.9222S | $\sqrt{0.2495}\,N$ |
| 6 | 0.9533S | $\sqrt{0.2498}\,N$ |
| 7 | 0.9720S | $\sqrt{0.2499}\,N$ |
| 8 | 0.9832S | $\sqrt{0.2500}\,N$ |
| 9 | 0.9899S | 0.5N |
| 10 | 0.9940S | 0.5N |
| 11 | 0.9964S | 0.5N |
| 12 | 0.9978S | 0.5N |
| 13 | 0.9987S | 0.5N |
| 14 | 0.9992S | 0.5N |

Table I illustrates the recorded signal and noise relationships for each one of successive identification periods when the recorder records 40 percent of the new cycle and 60 percent of the previously recorded signal for each identification period. The recorded signal is seen to approach a steady state level of $S$ and the noise approaches a steady state level of $0.5N$. This represents a 6 db improvement if the ratio with the new signal to old signal is defined as $K/(1-K) = 0.4/0.6 = 0.67$.

For the system as described, the relationship among the incoming signal $S$, the previously recorded signal $S'$, and the signal being recorded $S''$ is:

$$S'' = KS + (1-K)S'.$$

The ratio of the new signal to the previously recorded signal in the newly recorded signal is $K/1-K$. In the steady state, the previously recorded signal is equal to the newly recorded signal, so that:

$$S'' = KS + (1-K)\,S'',$$

from which we see that the recorded signal equals the incoming signal $(S'' = S)$.

The noise is most conveniently evaluated by calculating the noise squared. The relationship among the incoming noise squared $(N)^2$, the previously recorded noise squared $(N')^2$, and the newly recorded noise squared $(N'')^2$ is:

$$(N'')^2 = K^2\,(N)^2 + (1-K)^2\,(N')^2.$$

In the steady state, the previously recorded noise squared is equal to the newly recorded noise squared, so that:

$$(N'')^2 = K^2\,(N)^2 + (1-K)^2\,(N'')^2,$$

from which we see that $(N'')^2 = (K/2-K)\,(N)^2$.

Using the above information, Table II was prepared. In this table for each value of $K$ (the percent of new input signal used), the ratio of new signal to old recorded signal $K/1-K$, the steady state signal, the steady state noise squared, and the steady state improvement in signal to noise ratio in db is given.

TABLE II

| % Of New Signal | Ratio Of New Signal To Old | Steady State Signal | Steady State Noise Squared | Steady State S/N Improvement (db) |
|---|---|---|---|---|
| (K) | (K/1-K) | | | |
| 0 | 0 | | | |
| .1 | .111 | S | .053N² | 12.8 |
| .2 | .25 | S | .111N² | 9.5 |
| .3 | .43 | S | .177N² | 7.5 |
| .5 | 1.0 | | .333N² | 4.8 |
| .6 | 1.5 | S | .428N² | 3.7 |
| .7 | 2.33 | S | .538N² | 2.7 |
| .8 | 4.0 | S | .667N² | 1.8 |
| .9 | 9.0 | S | .82N² | 0.9 |

It is observed with reference to Table II that the smaller the ratio of the new to old signal being recorded during each recording period, the greater the improvement in signal to noise ratio. However, it is likewise observed that the number of identification periods required to reach steady state also increases as the ratio of new to old signal being recorded is reduced. As the ratio of new to old signal being recorded is reduced and the number of identification periods to each steady state increases, the improvement in signal to noise ratio increases also, providing that the playback is effected exactly one identification period $T_1$ (or exactly an integer multiple of identification periods $T_1$) from the record function. In practice there is a limit to the precision with which this spacing may be matched to the identification period and, therefore, there is a practical limit to the number of record cycles for which the first recorded code can be kept in step with the new incoming code. In effect, this places a limitation on the improvement in signal to noise ratio that is practical to achieve by the means depicted in FIG. 1 in addition to the natural limitation imposed by the length of time one can tolerate in a given embodiment for the signal to noise improvement realized by the invention to actually build up.

The system of FIG. 1 depends upon the levels $K$ and ($1$-$K$) being precise. If these levels are not precise, there may be undesirable buildup effects leading to limiting or oscillation in the recorded signal. While this might be avoided by using a number less than one in the expression ($1$-$K$), such as ($0.9$-$K$), the possibility of this expedient affecting the functioning of the system leads to a preferred automatic gain control attainment of level precision. FIG. 1 illustrates the automatic gain control recording feature wherein the magnitude of signal plus noise as developed at the recording head 20 is applied through line 18 to a level detector 25 the output 26 of which is applied as an AGC control to the recording amplifier 27 portion of the tape recorder. Thus, the gain of the recording amplifier is maintained at a constant level at the recording head.

The operation of the embodiment of FIG. 1 might be generally summarized as the employment of a cyclic recorder to add the incoming signal coherently to the previously recorded signal while adding the incoming noise incoherently to the previously recorded signal. A summing network is employed to control the magnitudes of the incoming signal and the previously recorded signal. Judicious choice of the ratio of the new signal as it is added to the previously recorded signal is seen to result in steady state signal to noise improvements which are inversely proportional to the combining ratio, while the number of cycles of coded transmissions necessary to reach a steady state condition increases as the steady state signal to noise improvement increases. The embodiment of FIG. 1, however, provides a range of practical design capability by means of which a repetitive encoded transmission signal may be vastly improved under adverse noise conditions.

FIG. 2 represents a purely digital embodiment of the invention which overcomes disadvantages of moving mechanical parts, and synchronism problems attendant to the analog approach of FIG. 1. In the system of FIG. 2, analog to digital conversion of the demodulated repetitive input code sequence provides the code sequences in digital form, and binary shift registers are employed to provide the necessary storage and time delay. Arithmetic adders and subtractors in FIG. 2 replace the analog summing networks of FIG. 1, and the output in the system of FIG. 2 is taken from a digital to analog converter.

With reference to FIG. 2, the analog input signal 15 corresponds to a repetitive identification code sequence signal as demodulated by preceding radio receiving equipment. In addition, the analog input signal 15 includes noise. Analog input signal 15 is applied to an analog to digital converter 50 which samples the input signal and converts the cyclic coded identification sequences to digital form. The sampling rate of the analog to digital converter 50 is controlled by a clock source 63 providing a train of clock timing pulses 61 for application to the analog to digital converter 50. The sampling rate under the control of the clock pulses 61 from clock 63 is at a sufficiently high rate to permit the original signal to be reconstructed by a digital to analog converter at the output of the signal enhancement system. For each sample in the incoming signal 15, predetermined bits of the paralleled outputs *64a–64c* of analog to digital converter 50 are applied to particular (respectively less) significant bit sections of the binary adder portion *51a* of a binary adder/subtractor 51. Binary adder *51a* is controlled by clock source 61. Each bit of the paralleled outputs 65 from binary adder *51a* is applied to a corresponding like significant bit stage of a binary subtractor *51s*. Each bit of the paralleled outputs *67a–67h* of binary subtractor *51s* is applied to an associated one of a plurality of shift registers 52–59. Each of the shift registers 52–59 receives the clock input 61 for shift purposes, and the shift register outputs 66 are applied back as respective inputs to corresponding significant bit sections of binary adder *51a*. The outputs *66f–66h* of the more significant bit ones of shift registers 52–59 (registers 57, 58, and 59) are applied back to binary subtractor *51s*, with the output of each particular significant bit shift register being shifted back by a particular number of digits as applied to subtractor *51s*. The outputs from (or, alternatively, the inputs to) the shift registers 52–59 comprise the output from the system and are applied to a digital to analog converter 62 which, under the control of clock pulses 61, converts the digital number circulating in the shift registers to analog form as an output 68 in the form of a reconstructed noise free analog coded identification signal.

The completely digital embodiment of FIG. 2 accomplishes the function of the previously discussed FIG. 1 embodiment with the added advantage that the system, in being completely digital, requires no mechanically moving parts.

Operation of the digital embodiment of FIG. 2 may best be comprehended by considering again the expression previously given for the newly recorded signal $S''$ as it pertains to the analog embodiment of FIG. 1. This expression was given as $S'' = KS + (1-K) S'$ where $S$ is the new input signal, $S'$ is the previously recorded signal, and K is a constant controlling the ratio of the new to previously recorded signal in the newly recorded signal. In the binary system of FIG. 2 the term $S$ again corresponds to the new input signal as applied on line 15, the term $S'$ corresponds to the stored identification signal as previously received, and $S''$ corresponds to the newly stored signal.

In a binary system, if $K$ is chosen to be an inverse power of two, i.e., $1/2^n$, digital multiplication by the constant $K$ may consist of merely shifting the digital input signal $S$ by $n$ digits in a manner similar to multiplying by a reciprocal of a power of 10 in the decimal system wherein the multiplication consists of shifting the decimal point.

If the above expression for the newly stored signal $S''$ is written as $S'' = KS + S' - KS'$, it is observed (and will be further clarified) that the application of the constant $K$ to $S$ places a limit upon the number of bits needed in the analog to digital converter 50 and further determines to which of the parallel input digits of the adder section 51*a* of adder/subtractor 51 the output of the analog to digital converter 50 should be connected.

Since the term $S'$ in the above expression does not contain the factor $K$, the outputs of the shift registers 52–59 are connected to associated like significant bit sections of the adder 51*a* of adder/subtractor 51.

Since the third term of the expression ($-KS'$) does contain the factor $K$, the outputs of the more significant ones of the outputs of the shift registers 52–59 are connected to the input digits of the subtractor section 51*s* of adder/subtractor 51 to those sections appropriate for the use of a particular chosen factor $K$.

The outputs of the adder/subtractor are then the new set of inputs $S''$ to respective ones of shift registers 52–59. If then the shift registers 52–59 are selected to have a length correspond to the length of the sampled identification code (or an integer multiple length thereof) that is, the length of each shift register equals the total number of samples taken out of each repetition of the identification code; at any instant of time the outputs of the shift register 52–59 will correspond to the same point on the identification code as the current output of the analog to digital converter 50. All system timing is under the control of time pulses 61 from clock 63 and thus the digital signal formed by the digital processing is analogous to the analog signal formed by the analog processing previously discussed. After digital to analog conversion by digital to analog converter 62, the same general result is obtained as for the analog case previously discussed.

By way of further operational description of the embodiment of FIG. 2, it is to be emphasized that the factor $K$ is chosen to be an inverse power of two, and in the illustrated embodiment this factor $K$ is chosen to be $1/2^5$. This establishes the number of digits by which the bit outputs from analog to digital converter 50 are shifted to correspondingly less-significant digits as applied to binary adder 51*a*. Reference to FIG. 2 illustrates that the most significant digit output 64*h* from analog to digital converter 50 is shifted five less-significant bits as applied to binary adder 51*a*. Likewise, the next most significant bit output 61*g* of converter 50 is shifted five less-significant bits as applied to adder 51*a* and the next most significant bit output 64*f* from converter 50 is likewise shifted by five bits.

The subtractive term of the above expression is implemented by applying the outputs of the most significant bit ones of shift registers 52–59 back to binary subtractor 51*s* shifted to five less-significant bits. Thus, the output 66*h* from the most significant bit shift register 59 is applied back to binary subtractor 51*s* shifted down five lesser significant bits. The output 66*g* of the next most significant bit shift register 58 is applied to binary subtractor 51 shifted down five significant digits. The output 66*f* of the next less- significant bit shift register 57 is applied to subtractor 51*s* shifted down five digits and thus to the least significant bit input of the section of the subtractor 51s. Thus, no further shift register feedbacks to subtractor 51*s* are employed.

It is to be noted that in implementing the factor $K$ in the digital approach of FIG. 2 (by shifting more significant bits into positions normally occupied by less-significant bits) the total number of significant bits required from the analog to digital converter 50 is reduced from that defined in the system. With reference to FIG. 2, although eight-bit accuracy is implemented in the system, only three bits are required from analog to digital converter 50.

The system of FIG. 2 provides a function similar to that of the analog embodiment of FIG. 1. While in the analog embodiment the output of the recorder was multiplied by a factor $(1-K)$ before being fed to the adder where it was combined with the input before it was recorded, the digital approach accomplishes the same result by adding the output to the input and subtracting $K$ times the output. The output of the shift registers are fed back to the adder where they are added with the inputs, and the outputs of the shift registers are shifted by the desired number of digits and subtracted from the sum of input and output. The result of this addition and subtraction then forms the new inputs to the shift registers and the same general result is obtained at output 68 in FIG. 2 [after digital to analog conversion of the outputs from (or inputs to) the shift registers] as was obtained in the analog embodiment of FIG. 1.

It might further be emphasized that the length of the shift registers 52–59 may correspond to a single identification code sequence or to an integral multiple of that time element by judicious choice of the repetition rate of the output 61 from timing clock source 63.

The present invention is thus seen to provide means of enhancing or improving a repetitive coded identification signal in the presence of extreme noise. The invention has been described with respect to particular embodiments both analog and digital. It should be emphasized that the present invention generally resides in a means for coherently combining repetitive intelligence data while incoherently combining noise which may accompany same, and this result is generally accomplished by repetitively combining percentage-complementary portions of currently received and stored intelligence transmission sequences to arrive at an improved output signal and thus provide a significant improvement in signal to noise ratio as concerns the reception of repetitive information sequences.

Thus, although the present invention has been described with respect to particular embodiments thereof, it is not to be so limited as changes might be made therein which fall within the scope of the invention as defined in appended claims.

I claim:

1. Means for developing an output signal having an improved signal to noise ratio over a received signal, said received signal comprising a repetitive coded analog signal having a repetition rate $F_1$ establishing a repetition period of $T_1$, comprising signal processing means developing an output signal $S''$ in accordance with the expression $S''=KS+(1-K)S'$, where $S$ is an instantly received input signal, $S'$ is the previously received input signal, and $K$ is a constant controlling a combining ratio of the new to previously received signals and comprises an inverse integer power of two, $1/2^n$; said signal processing means comprising an analog to digital converter receiving said input signal and a clock timing source as inputs thereto, a multi-bit binary adder receiving said clock source and the output of said analog to digital converter as inputs thereto, the outputs of predetermined ones of the most significant bit outputs from said analog to digital converter being shifted by $n$ less-significant bits as applied to said binary adder, a multi-bit binary subtractor receiving said clock source and unshifted bit outputs from said binary adder as inputs thereto, a plurality of shift registers each receiving said clock source and an associated one of successively more-significant bit outputs from said binary subtractor as inputs thereto, the output of each shift register applied as input to an associated like-significant bit section of said binary adder, the outputs of predetermined ones of the most significant bit ones of said shift registers being applied as inputs to said binary subtractor and shifted by $n$ less-significant bits as applied to said subtractor, whereby a binary number corresponding to the associated input from said binary subtractor continuously circulates through each of said shift registers at said clock rate, and the binary number circulating through said shift registers comprising said output signal.

2. Signal development means as defined in claim 1 wherein said output signal comprises the output of at least one of said shift registers.

3. Signal development means as defined in claim 2 wherein said output signal is applied to a digital to analog converter, said clock source being applied as a timing input to said digital to analog converter, and the output from said digital to analog converter comprising said output signal.

4. Signal development means as defined in claim 1 wherein said output signal comprises the input to at least one of said plurality of shift registers.

5. Signal development means as defined in claim 4 wherein said output signal is applied to a digital to analog converter, said clock source being applied as a timing input to said digital to analog converter, and the output from said digital to analog converter comprising said output signal.

* * * * *